US011976235B2

(12) United States Patent
Ward et al.

(10) Patent No.: US 11,976,235 B2
(45) Date of Patent: May 7, 2024

(54) HIGH TEMPERATURE THERMOCHEMICAL ENERGY STORAGE MATERIALS

(71) Applicant: SAVANNAH RIVER NUCLEAR SOLUTIONS, LLC, Aiken, SC (US)

(72) Inventors: Patrick A. Ward, Aiken, SC (US); Ragaiy Zidan, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 197 days.

(21) Appl. No.: 17/080,955

(22) Filed: Oct. 27, 2020

(65) Prior Publication Data

US 2022/0128270 A1    Apr. 28, 2022

(51) Int. Cl.
C09K 5/16    (2006.01)
C22C 1/10    (2023.01)
C22C 24/00    (2006.01)
F24V 30/00    (2018.01)
F28D 20/00    (2006.01)

(52) U.S. Cl.
CPC .................. C09K 5/16 (2013.01); C22C 1/10 (2013.01); C22C 24/00 (2013.01); F24V 30/00 (2018.05); F28D 20/003 (2013.01)

(58) Field of Classification Search
CPC . C09K 5/06; C09K 5/063; C09K 5/08; C09K 5/12; C09K 5/14; C09K 5/16; F24V 30/00; F28D 20/00; F28D 20/003
See application file for complete search history.

(56) References Cited

U.S. PATENT DOCUMENTS

| 6,141,966 A | 11/2000 | Osumi |
| 6,328,821 B1 | 12/2001 | Ovshinsky et al. |
| 6,471,935 B2 | 10/2002 | Jensen et al. |
| 7,094,387 B2 | 8/2006 | Zidan |
| 7,279,222 B2 | 10/2007 | Hearley et al. |
| 7,384,574 B2 | 6/2008 | Zidan et al. |
| 7,462,344 B2 | 12/2008 | Vajo et al. |

(Continued)

FOREIGN PATENT DOCUMENTS

| CN | 105603278 A | * | 5/2016 | |
| EP | 1764853 A1 | * | 3/2007 | ............. C22C 24/00 |

(Continued)

OTHER PUBLICATIONS

Widera et al. ("Preparation and Structure of A3Al2Si2 (A = Ca, Sr, Ba)," Z. Nantrforsch. 32b, 1340-1351, 1977) (Year: 1977).*

(Continued)

Primary Examiner — Matthew R Diaz
(74) Attorney, Agent, or Firm — Dority & Manning, P.A.

(57) ABSTRACT

Disclosed are high enthalpy thermochemical energy storage materials that exhibit high thermal conductivity and stability at high temperature reaction conditions. Disclosed materials include hydride-based alloys that can undergo high temperature reversible hydrogenation/dehydrogenation reactions without phase change of any metal or metalloid components of the alloy. The materials undergo a reversible exothermic hydrogenation reaction to form a metal hydride and a ternary alloy that includes a high thermal conductivity metal that, in its pure state, would exhibit a phase change at the hydrogenation reaction conditions.

5 Claims, 3 Drawing Sheets

(56) References Cited

U.S. PATENT DOCUMENTS

| | | | |
|---|---|---|---|
| 7,510,996 B2* | 3/2009 | Aoki | C01B 3/0063 |
| | | | 502/232 |
| 8,372,561 B2 | 2/2013 | Zimmerman et al. | |
| 8,377,555 B2 | 2/2013 | Mohtadi et al. | |
| 8,883,109 B2 | 11/2014 | Zidan et al. | |
| 8,945,500 B1 | 2/2015 | Zidan et al. | |
| 9,199,844 B2 | 12/2015 | Zidan et al. | |
| 9,777,968 B1* | 10/2017 | Vajo | F28D 20/003 |
| 9,840,412 B2 | 12/2017 | Zidan et al. | |
| 9,913,411 B2 | 3/2018 | De Bock et al. | |
| 10,443,954 B1* | 10/2019 | Zidan | F28D 20/003 |
| 2007/0014683 A1* | 1/2007 | Zhao | C22C 24/00 |
| | | | 420/407 |
| 2011/0091352 A1* | 4/2011 | Fang | C22C 24/00 |
| | | | 420/591 |
| 2012/0227926 A1 | 9/2012 | Field et al. | |
| 2014/0238634 A1 | 8/2014 | Ronnebro et al. | |
| 2016/0209124 A1* | 7/2016 | Da Silvaa | F28D 20/021 |

FOREIGN PATENT DOCUMENTS

| | | | | |
|---|---|---|---|---|
| GB | 1503850 | 3/1978 | | |
| WO | WO 2010/057367 | 5/2010 | | |
| WO | WO 2010/147674 | 12/2010 | | |
| WO | WO-2019239141 A1 * | 12/2019 | | C01B 3/0005 |
| WO | WO 2020/010206 | 1/2020 | | |
| WO | WO-2020010206 A1 * | 1/2020 | | C22C 24/00 |
| WO | WO-2021049166 A1 * | 3/2021 | | C01B 33/06 |

OTHER PUBLICATIONS

Li et al. ("Ca3Al2Si2: An inorganic structure analogous to but not isoelectronic with polyacene," J. Phys. Chem. 1988, 92, 887-893) (Year: 1988).*

Kevorkov et al. ("The Al—Li—Si system," Journal of Solid State Chemistry, 156, 500-505, 2001) (Year: 2001).*

Wu et al. ("Structure an thermodynamic properties of Li8Al3Si5," Journal of Alloys and Compounds, 426, 2006, 57-63) (Year: 2006).*

Miyoshi et al. ("Hydriding and dehydriding properties of Ca—Si—X," Journal of Alloys and Compounds, 446-447, 2007, 15-18) (Year: 2007).*

Alapati et al. ("Identification of destabilized metal hydrides for hydrogen storage using first principles calculations", J Phys. Chem. B, 2006, 110, 8769-8776) (Year: 2006).*

Antzara, et al. "Development of CaO-based Mixed Oxides as Stable Sorbents for Post-Combustion $CO_2$ capture via Carbonate Looping" *Ener. Proc.* 63 (2014) pp. 2160-2169.

Corgnale, et al. "Screening Analysis of Metal Hydride Based Thermal Energy Storage Systems for Concentrating Solar Power Plants" *Renew. Sustain. Ener. Rev.* 38 (2014) pp. 821-833.

Graetz, J. "Metastable Metal Hydrides for Hydrogen Storage" *ISRN Mater. Sci.* 2012:863025 (2012) pp. 1-18.

Khare, et al. "Selection of materials for high temperature latent heat energy storage" *Sol. Ener. Mater. Sol. Cells* 107 (2012) pp. 20-27.

Manickam, et al. "Future perspectives of thermal energy storage with metal hydrides" *Int'l J. Hydrog. Ener.* 44 (2019) pp. 7738-7745.

Nicholson, K.M. "First Principles Calculations of Thermodynamics of High Temperature Metal Hydrides for NGNP Applications" *GA Inst. Tech.* (2014) pp. 1-260.

Semi, T.E. "The mechanism behind the calcium aluminum silicide ternary structural preference and the origin of its semimetal behavior" *CO Sch. Mines* (2013) pp. 1-108.

Sheppard, et al. "Metal hydrides for concentrating solar-thermal power energy storage" *Appl. Phys. A* 122:395 (2016) pp. 1-15.

Sheppard, et al. "Hydriding characteristics of NaMgH2F with preliminary technical and cost evaluation of magnesium-based metal hydride materials for concentrating solar power thermal storage" *RSC Adv.* 51 (2014) pp. 26552-26562.

Ward, et al. "High temperature thermal energy storage in the $CaAl_2$ system" *J. Alloys Comp.* 735 (2018) pp. 2611-2615.

Ward, et al. "Technical challenges and future direction for high efficiency metal hydride thermal energy storage systems" *Appl. Phys. A* 122:462 (2016) pp. 1-10.

Ward, et al. "High performance metal hydride material based thermal energy storage systems for concentrating solar power applications" *J. Alloys Comp.* 645 (2015) pp. S374-S378.

Björling, T. "Synthesis and characterisation of Zintl hydrides" *Stockholm U.* (2008) pp. 1-27.

ISA. "International Search Report and Written Opinion" PCT/US2021/056770 (2022) pp. 1-10.

* cited by examiner

HIGH TEMPERATURE THERMOCHEMICAL ENERGY STORAGE MATERIALS

STATEMENT REGARDING FEDERALLY SPONSORED RESEARCH OR DEVELOPMENT

This invention was made with government support under Contract No. DE-AC09-08SR22470, awarded by the United States Department of Energy. The government has certain rights in the invention.

BACKGROUND

Efficient energy storage is necessary in order to effectively utilize renewable energy sources. Thermal energy storage (TES) systems are those that can store excess thermal energy for use at a later time and are of particular interest in solar systems. TES systems typically utilize one of three different approaches for storing thermal energy including sensible heat materials, latent heat materials, and thermochemical heat materials. Sensible heat materials store thermal energy based on their heat capacity and have the lowest thermal energy density of the three classes. Sensible heat materials include molten salts, various oils, and solids, such as building materials, e.g., fabrics, metals, brick, etc. Latent heat materials have a high enthalpy associated with a phase change and have been gaining attention for TES applications. Latent heat phase change materials of interest include organics (e.g., paraffin waxes, fatty acids, glycols), salt hydrates, metals, metal alloys, and eutectics. Thermochemical heat materials store thermal energy by use of a reversible thermochemical reaction. At high energy input, an endothermic reaction takes place, effectively storing energy in the chemical bonds formed during the reaction. The reaction products are stored separately and later recombined in an exothermic reaction to release the stored energy. While sensible and latent heat materials are still the most common TES materials, primarily molten salts, the achievable energy densities and heat storage periods for these materials are far less than those of thermochemical energy storage materials.

Thermochemical energy storage materials based on carbonation, oxidation, hydration, and hydrogenation reactions are among those being examined in development of improved energy storage. Among the possible thermochemical TES materials, metal hydride-based materials that utilize reversible hydrogenation/dehydrogenation reactions have the beneficial capability to store and release a large amount of heat with a high energy density, making them ideal candidates for thermochemical energy storage.

Metal hydrides show good reversibility and cycling stability combined with high enthalpies. They can be used for both short- and long-term heat storage applications and can increase the overall flexibility and efficiency of thermal-based energy production. Metal hydrides with working temperatures less than 500° C. have been the focus of research and development over the last few years. However, for the next generation of solar thermal energy plants, new high temperature metal hydride-based materials with working temperatures above 600° C. must be developed.

Hydride-based materials that exhibit favorable thermodynamic properties, and in particular, high enthalpy, could enable operation temperatures higher than those of molten salts (i.e., greater than about 565° C.) with lower costs and greater heat storage capacities and therefore greater efficiencies. A high enthalpy material is necessary to reach the operating temperatures required for high efficiency high temperature operations. High enthalpy hydrides such $CaH_2$, $LiH_2$ and $TiH_2$ release their hydrogen at very high temperatures (above 800° C.) but unfortunately are either too expensive (titanium-based materials), or if suitable from a cost point of view (e.g., $CaH_2$ and $LiH_2$), can melt, evaporate, or sublime during reactions at high temperatures. Such issues further complicate development of efficient high temperature thermochemical energy storage materials.

Thermal conductivity of many metal hydrides is also a limiting factor that can cause significant increase of cost and reduction in performance. Low thermal conductivity limits the rate at which heat can be extracted from the reaction bed and leads to system inefficiency. In an attempt to improve the thermal conductivity of systems, approaches, including incorporation into the beds of additives with high thermal conductivities, such as aluminum, have been attempted. Unfortunately, low-cost high-thermal conductivity additives such as aluminum (having a melting temperature at typical reaction conditions of 660° C.) are not suitable for high temperature thermal energy storage materials due to phase segregation.

What are needed in the art are thermochemical energy storage materials that are cost effective and display efficient and reversible energy storage reactions at high temperatures.

SUMMARY

According to one embodiment, a thermochemical energy storage material that includes an energy storage alloy is disclosed. The energy storage alloy has a thermal conductivity at a temperature of about 100° C. and higher, of about 1 W/mK or greater. A first component of the energy storage alloy forms a hydride in a hydrogenation reaction between the energy storage alloy and hydrogen. A second component of the energy storage alloy has a thermal conductivity of about 90 W/mK or greater. Upon a hydrogenation reaction, the energy storage alloy reacts with hydrogen to form the hydride and a ternary stabilization alloy.

A method for temporarily storing thermal energy by use of a thermochemical energy storage material is also described. A method can include reacting a ternary stabilization alloy with a metal hydride according to an endothermic dehydrogenation reaction. The ternary stabilization alloy includes as a first component a metal that is also the metal of the metal hydride. The ternary stabilization alloy also includes as a second component a metal that in its pure form has a melting temperature less than that of the reaction temperature and that has a thermal conductivity of about 100 W/mK or greater. Upon the dehydrogenation reaction, hydrogen and an energy storage alloy are formed. The energy storage alloy includes the first component, the second component, and a third component. At a later time, the energy storage alloy can be contacted with hydrogen and the hydrogen can react with the energy storage alloy according to an exothermic hydrogenation reaction. In accord with the hydrogenation reaction, the energy storage alloy reacts with the hydrogen to form the metal hydride and the ternary stabilization alloy.

According to one embodiment, the energy storage alloy can be $Ca_3Al_2Si_2$ and the ternary stabilization alloy can be $CaAl_2Si_2$. Methods for forming this particular energy storage alloy are also described. In one embodiment, the energy storage alloy can be formed according to the following reaction scheme:

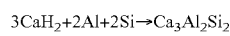

wherein the reaction is carried out at a temperature of about 800° C. or greater under vacuum either with or without agitation.

According to another embodiment, the energy storage alloy can be formed according to the following reaction scheme:

$$CaSi_2+2Ca+2Al \rightarrow Ca_3Al_2Si_2$$

wherein the reaction is carried out at a temperature of about 1000° C. or greater under inert gas or vacuum and either with or without agitation.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
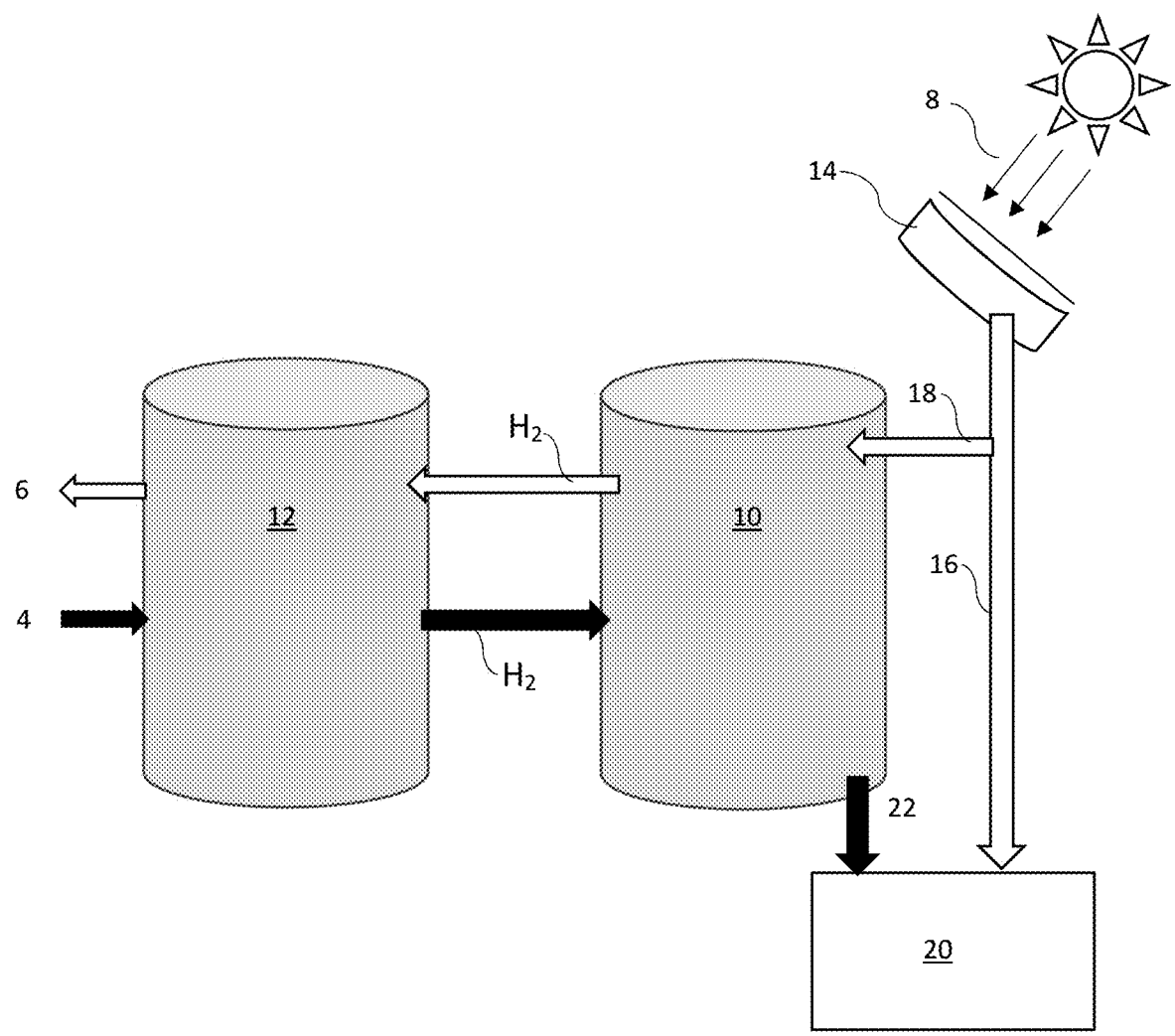
FIG. 1 schematically illustrates a simplified diagram of a metal hydride-based thermal energy storage system as may incorporate a thermochemical energy storage material described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are high enthalpy TES materials that can exhibit high thermal conductivity and stability at high temperature reaction conditions. More specifically, disclosed materials are hydride-based thermochemical heat materials that include alloys that can undergo high-temperature (e.g., about 500° C. or higher) reversible hydrogenation/dehydrogenation reactions without phase change of any metal or metalloid components of the system.

The disclosed alloys can incorporate a high thermal conductivity additive within the crystal structure of the alloy. High thermal conductivity additives of interest include those that would be expected to exhibit a phase change (e.g., melt) at the reaction temperatures of interest. However, through incorporation of the additive within the crystal structure of the alloy, the additive can be stabilized at the temperatures of interest and can enhance the thermal conductivity of the TES materials without phase change. The disclosed alloys can thus provide an additional class of metal hydride thermal energy storage materials.

In addition to exhibiting both high enthalpy and high thermal conductivity, disclosed materials can maintain desirable hydrogen absorption and release characteristics across a large number of cycles. For a TES system to operate for a lifetime of about 30 years, it is estimated that the energy storage materials must be able to cycle approximately 11,000 times with low degradation over these cycles. Thus, the reversibility of an energy storage material over extended cycling is of great importance in TES applications. Disclosed energy storage materials can exhibit high stability for such long-life applications.

The energy storage alloys of the disclosed TES materials can have a general structure given by:

$$A_xB_yC_z$$

in which x≥2, y, z≥1

A first component "A" of an energy storage alloy can be a metal capable of forming a hydride upon a high temperature exothermic hydrogenation reaction. The first component A can include an alkali metal, an alkaline earth metal, or a transition metal such as, and without limitation to, calcium, lithium, magnesium, titanium, or sodium, or combinations thereof. The hydride formed in the hydrogenation reaction can include high enthalpy hydrides such as $CaH_2$, $LiH$, $MgH_2$, and $TiH_2$. In one embodiment, the component A can include two different materials, at least one of which is a metal capable of forming a hydride upon a high temperature exothermic hydrogenation reaction and the other remaining in the ternary stabilization alloy upon the hydrogenation reaction.

Upon the hydrogenation reaction of the energy storage alloy, a ternary stabilization alloy can be formed in conjunction with the metal hydride. As such, the chemical formula for the energy storage alloy will include at least two of the A component (i.e., x≥2 in the above structure) so as to maintain a ternary composition in the resulting stabilization alloy.

In those embodiments in which the ternary stabilization alloy is capable of undergoing a further hydrogenation reaction, the reaction conditions necessary for this further hydrogenation reaction can be outside of the operating conditions of the system of interest. For instance, in one embodiment, the energy storage alloy can be $Ca_3Al_2Si_2$. Upon high temperature hydrogenation (e.g., about 500° C. to about 900° C.), this energy storage alloy can react to form the calcium hydride $CaH_2$ and the ternary stabilization alloy $CaAl_2Si_2$, i.e.:

$$Ca_3Al_2Si_2+2H_2 \rightarrow CaAl_2Si_2+2CaH_2$$

The product ternary stabilization alloy $CaAl_2Si_2$ can be stable at high temperatures (e.g., 700° C.-900° C.) and pressures (e.g., about 30 to about 60 bar $H_2$) of interest. For instance, the further hydrogenation of $CaAl_2Si_2$, i.e.:

$$CaAl_2Si_2+H_2 \rightarrow CaH_2+2Al+2Si$$

will only take place at hydrogen partial pressures greater than 80 bar for a system at 750° C. This pressure is well above any desirable or feasible operating pressures for a TES system based on metal hydrides. This same approach can be taken for any energy storage alloy encompassed herein. Further hydrogenation of a ternary stabilization alloy that could release components from the crystal structure and lead to an undesirable phase change can be avoided through control of the system conditions, e.g., by ensuring that the H₂ pressure and/or the reaction temperature remain below that necessary for the further hydrogenation reaction.

The second component of an energy storage alloy, i.e., "B" in the above structure, can be an additive that exhibits a high thermal conductivity, e.g., about 90 W/mK or greater, or about 100 W/mK or greater in some embodiments. In one embodiment, the second component can also be a material that would, in its pure form, be expected to exhibit a phase transition at the reaction conditions of interest. For instance, aluminum has a melting temperature of about 660° C., and as such, is typically not considered feasible for use in a high temperature metal hydride-based TES material. In the disclosed materials, however, an aluminum additive can be incorporated in the crystal structure of the ternary stabilization alloy, and thereby, the aluminum can be stabilized in the alloy and prevented from melting at the reaction conditions of interest.

A high thermal conductivity additive of an energy storage material can include, without limitation, aluminum, copper, zinc, nickel, iron, etc.

The third component of the alloy, the C component is not particularly limited and can encompass any material that can generate the stabilization alloy. For instance, and without limitation, the C component of the above structure can include carbon, sulfur, silicon, boron, nitrogen, or any other element that can form the alloy with the other components. In one embodiment, the C component can be a relatively light weight element, e.g., less than about 150 atomic mass units, so as to provide a higher gravimetric energy density to the alloy.

A thermochemical energy storage material that includes an energy storage alloy as described can exhibit a favorable thermal conductivity; for instance, about 1 W/mK or higher at temperatures of about 100° C. or higher, such as about 4 W/mK or higher or about 6 W/mK or higher in some embodiments. In addition, an alloy as described can exhibit a reversible hydrogenation/dehydrogenation reaction at favorable hydrogen pressures; for instance, at a hydrogen pressure of about 60 bar or less, such as from about 5 bar to about 60 bar, about 10 bar to about 55 bar, about 15 bar to about 50 bar, or about 25 bar to about 45 bar, in some embodiments, and at high temperature reaction conditions, such as about 500° C. or higher, or about 700° C. or higher in some embodiments, such as from about 700° C. to about 900° C. or from about 750° C. to about 850° C. in some embodiments.

In one embodiment, the energy storage alloy can be $Ca_3Al_2Si_2$ and the ternary stabilization alloy can be $CaAl_2Si_2$. In one embodiment, this particular energy storage alloy can be formed according to a reaction scheme that utilizes either calcium hydride or calcium silicide as a calcium source reactant. For instance, the $Ca_3Al_2Si_2$ can be formed according to the following reaction scheme:

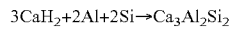
$$3CaH_2 + 2Al + 2Si \rightarrow Ca_3Al_2Si_2$$

wherein the reaction is carried out at a temperature of about 800° C. or greater under vacuum (e.g., less than atmospheric pressure, such as about 20% of atmospheric pressure or less) and either with or without agitation.

According to another embodiment, this particular energy storage alloy can be formed according to the following reaction scheme:

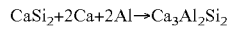
$$CaSi_2 + 2Ca + 2Al \rightarrow Ca_3Al_2Si_2$$

wherein the reaction is carried out at a temperature of about 1000° C. or greater under inert gas or vacuum and either with or without agitation.

In one embodiment, a thermochemical energy storage material can include one or more additives, in addition to an alloy as described. For instance, a thermochemical energy storage material can include a carbon-based thermal conductivity modulator, such as carbon black and/or carbon nanoparticles. Carbon nanoparticles can include, without limitation, carbon nanotubes and/or graphene. In one embodiment, a thermochemical energy storage material can include an ionic liquid as a thermal conductivity modulator.

In one embodiment, a thermochemical energy storage material can include a graphitic carbon; for instance, a graphitic matrix structure, e.g., a graphite foam, or an expanded graphite, e.g., an expanded natural graphite. For example, a graphite foil of the trademark Sigraflex®, material type L30010C can be used.

Processes for the production of expanded graphite are known. The starting material can be a flaky natural graphite. The graphite flakes of the starting material are treated with a solution of an intercalating agent, e.g., with a mixture of concentrated sulfuric acid and nitric acid, with fuming nitric acid or with a mixture of hydrogen peroxide and concentrated sulfuric acid, or the like, resulting in the formation of a graphite salt or a graphite intercalation compound.

The graphite-intercalation compounds or graphite salts (e.g., graphite hydrogen sulfate or graphite nitrate) are then heated in a shock-like manner. Conventionally, the intercalated graphite is expanded by a factor of between 100 and 300. The expansion reduces the density from about 600 grams per liter (g/l) to 700 g/l of the intercalation compound to about 2 g/l to 7 g/l of the expanded graphite. If the expanded graphite is compacted under the directional action of pressure, the layer planes of graphite preferably align perpendicularly to the direction of action of pressure, with the individual aggregates hooking up with each other. As a result, planar structures, for example, sheets, webs, or plates, of graphite matrix can be produced that are self-supporting without the addition of any binder. The thermal conductivity in a direction parallel to the plane of the foil can be between about 70 W/mK and about 500 W/mK, while the thermal conductivity perpendicular to the plane of the foil can be between about 3 W/mK and about 6 W/mK.

Ultra-thin graphite foam has been reported to have very high thermal conductivity applications (see, e.g., U.S. Patent Application Publication No. 2016/0209124, incorporated herein by reference). A graphite foam can include a three-dimensional (3D) interconnected graphite structure. Upon filling the pores of the foam with an active material, such as an alloy as described herein for thermal exchange, the 3D interconnected graphite structures can efficiently transport heat to and from the active materials embedded in the pores of the graphite foam. The 3D interconnected graphite structures of the graphite foam provide a 3D matrix of pores surrounded by interconnected walls. These interconnected walls of the graphite foam can be further modified by introducing a second additive into the pores of the matrix. Carbon nanotubes, for example, can be grown on the walls and inside the pores of the graphite foam to provide additional graphitic materials.

In one embodiment, a graphitic carbon matrix can be produced according to a 3D printing processes. For examples, 3D printing can be used to form templates that are subsequently graphitized to yield a 3D printed graphitic matrix. 3D printing can provide precise control over the morphology of the graphitic material. Accordingly, 3D-printed graphitic matrixes can possess a structure comprising a microporous network formed of continuous graphitic material.

The thermochemical energy storage materials including an energy storage alloy and optionally, one or more additives, can be incorporated in an energy storage system according to any suitable approach. By way of example, in one embodiment, a TES system can include a shell and tube heat exchanger, as is generally known in the art. A heat transfer fluid, e.g., a heat transfer oil or the like, can flow inside the tubes, and the thermochemical energy storage materials including an energy storage alloy as described herein can be packed around the tubes In one embodiment, a thermochemical energy storage material can be incorporated in a dual-bed hydride reactor system such as can be utilized in a concentrating solar power application, a simplified diagram of which is illustrated in FIG. 1. As illustrated, a dual-bed hydride reactor system can include a high temperature metal hydride bed 10 and a low temperature metal hydride bed 12. During the day, the solar energy 8 that impacts a solar concentrator 14 provides thermal energy that can be sent 16 to a power system 20; for instance, to produce electricity. A portion of the collected thermal energy can be sent 18 to the high temperature metal hydride bed 10 and used to encourage the endothermic dehydrogenation reaction of the ternary stabilization alloy, which thereby forms hydrogen gas and the energy storage alloy. The hydrogen that forms is allowed to flow to the low temperature metal hydride bed 12, where a low temperature metal hydride (e.g., a sodium aluminum hydride or the like) is hydrogenated. The heat generated 6 in the exothermic hydrogenation reaction in the low temperature hydride bed 12 can be cycled to the power system 20 or used in some other fashion.

When the sun is not shining, thermal energy 4 is provided to the low temperature metal hydride bed 12, for instance from the power system 20, to encourage the endothermic dehydrogenation reaction of the low temperature metal hydride and form hydrogen. The hydrogen from the low temperature metal hydride bed 12 then flows to the high temperature metal hydride bed 10 and encourages the exothermic hydrogenation of the energy storage alloy in the high temperature metal hydride bed 10 and generates the metal hydride and the ternary stabilization alloy, as well as heat 22, that can be used to produce power at the power system 20.

The favorable thermodynamics of a system that can be formed through inclusion of an energy storage alloy as described can provide for a concentrated solar power plant that can operate 24 a day, with the TES system storing and releasing the needed thermal energy to maintain continuous operation of a power system. Such a system can be a self-sustaining system, with the hydrogen moving between the two beds and exploiting the temperature gradients available during charging and discharging processes.

The present disclosure may be better understood with reference to the Examples set forth below.

Example

An energy storage alloy having the chemical formula of $Ca_3Al_2Si_2$ was formed and characterized. For the formation, $CaH_2$, silicon powder, and aluminum powder were mixed together in a stoichiometric ratio of (3:2:2) respectively. This mixture was heated to 850° C. under vacuum for 16 hours. The material was then mixed via mortar and pestle in an argon atmosphere and heated under vacuum for an additional 16 hours at 850° C. The material was collected and stored under an argon atmosphere.

Figure 2:
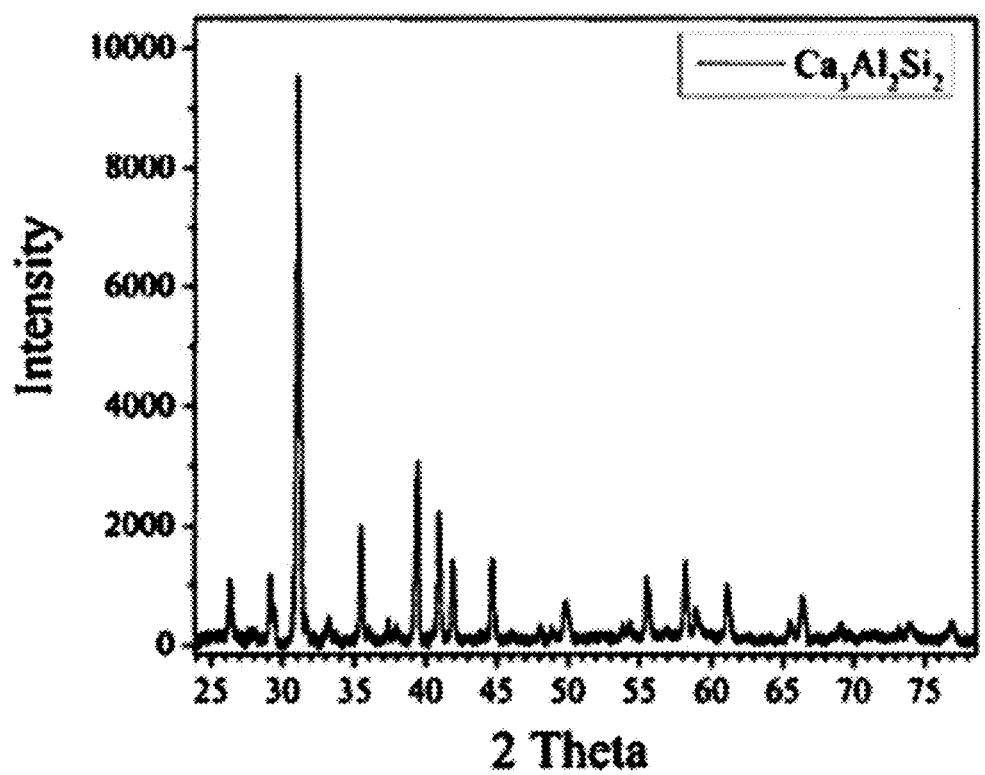
FIG. 2 presents an X-ray diffraction pattern for $Ca_3Al_2Si_2$.
Figure 3:
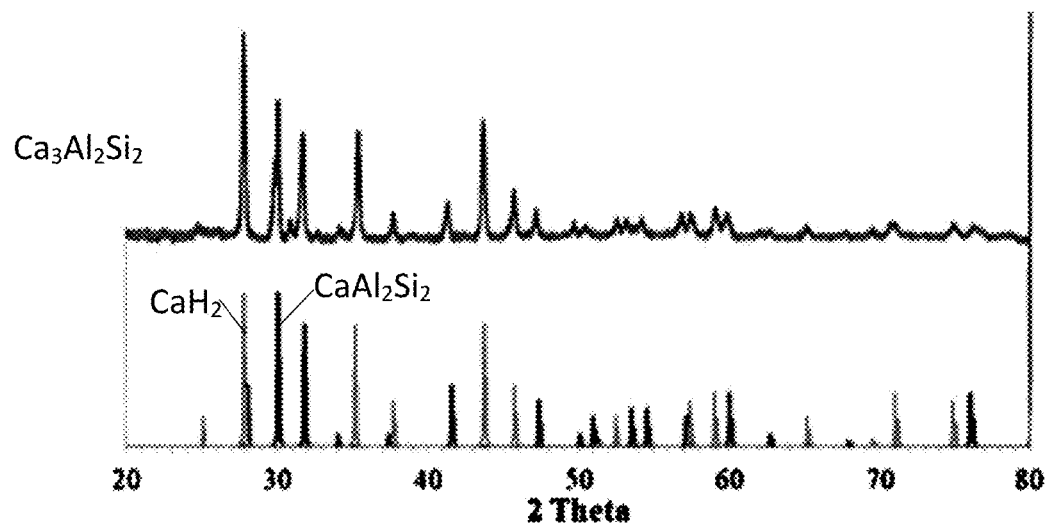
FIG. 3 compares the X-ray diffraction patter of $Ca_3Al_2Si_2$ with its hydrogenation reaction products, $CaAl_2Si_2$ and $CaH_2$.
Figure 4:
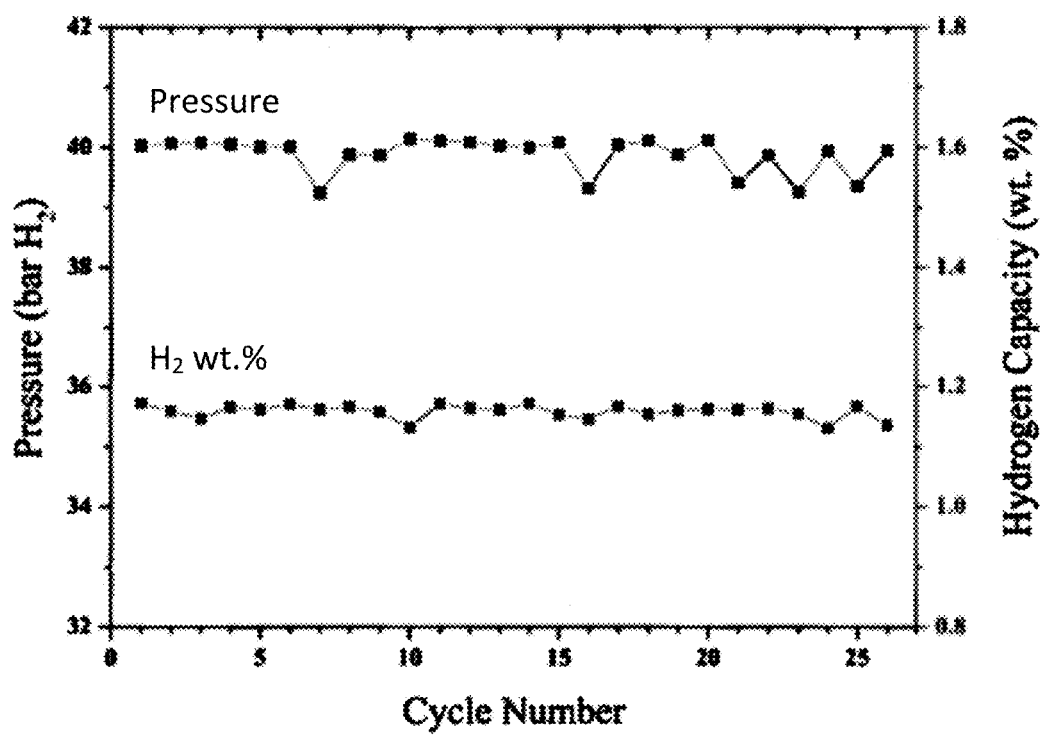
FIG. 4 presents cycling data for a $Ca_3Al_2Si_2/CaAl_2Si_2$ system at 750° C.
Figure 5:
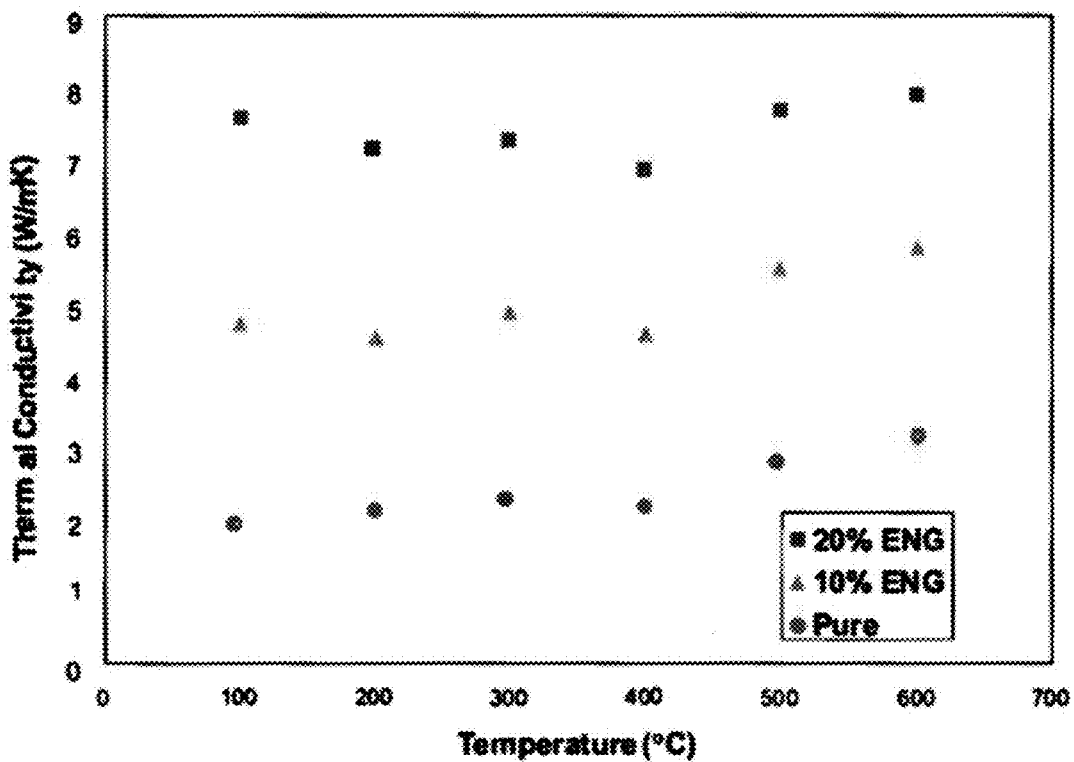
FIG. 5 presents the thermal conductivity of pure $Ca_3Al_2Si_2$, $Ca_3Al_2Si_2$ combined with 10 wt. % expanded natural graphite (ENG), and $Ca_3Al_2Si_2$ combined with 20 wt. % ENG.

FIG. 2 shows the x-ray diffraction signature pattern for the $Ca_3Al_2Si_2$ alloy. FIG. 3 shows the x-ray diffraction signature pattern for the $Ca_3Al_2Si_2$ alloy and for the reaction products following hydrogenation at 45 bar $H_2$ and 750° C. The data clearly confirms the expected products, $CaH_2$ and the ternary stabilization alloy $CaAl_2Si_2$. FIG. 4 shows cycling data for the material at 750° C. and 40 bar over 25 3-hour cycles and demonstrates the retained hydrogen capacity. This retained hydrogen capacity further illustrates the prevention of phase segregation from the melting of aluminum which, if it occurred, would cause the capacity to drop over cycling. The thermal conductivity of the $Ca_3Al_2Si_2$ alloy in its pure state and with the addition of expanded natural graphite as an additive is shown in FIG. 5.

While certain embodiments of the disclosed subject matter have been described using specific terms, such description is for illustrative purposes only, and it is to be understood that changes and variations may be made without departing from the spirit or scope of the subject matter.

What is claimed is:

1. A thermochemical energy storage material comprising:
   a) a single phase composition comprising a combination of $CaAl_2Si_2$ and $CaH_2$; and
   b) a thermal conductivity moderator comprising graphitic carbon; wherein
   the thermochemical energy storage material is stable at a temperature of from 700° C. to 900° C. and at a pressure of from about 5 bar $H_2$ to about 60 bar $H_2$.

2. The thermochemical energy storage material of claim 1, wherein a dehydrogenation reaction of the single phase composition forms $Ca_3Al_2Si_2$ and $H_2$.

3. The thermochemical energy storage material of claim 1, wherein the single phase composition has a thermal conductivity of at least about 4 W/mK at a temperature of about 100° C.

4. The thermochemical energy storage material of claim 1, wherein the single phase composition has a thermal conductivity of at least about 6 W/mK at a temperature of about 100° C.

5. The thermochemical energy storage material of claim 1, wherein the thermal conductivity moderator defines pores, the pores containing the single phase composition.

* * * * *